(12) United States Patent
Lee

(10) Patent No.: US 6,389,858 B1
(45) Date of Patent: May 21, 2002

(54) LOCK STRUCTURE FOR STEERING WHEEL LOCKING BY TURNING THE WHEEL

(76) Inventor: Chun-Chang Lee, No. 8, Alley 5, Lane 16, Kweiyang St., Thaishan Village Taipei County (TW)

(*) Notice: Subject to any disclaimer, the term of this patent is extended or adjusted under 35 U.S.C. 154(b) by 0 days.

(21) Appl. No.: 09/824,753

(22) Filed: Apr. 4, 2001

(51) Int. Cl.[7] .............................................. B60R 25/02
(52) U.S. Cl. ........................... 70/209; 70/237; 180/287
(58) Field of Search .......................... 70/209–212, 225, 70/226, 237, 238; 180/287

(56) References Cited

U.S. PATENT DOCUMENTS

| | | | | |
|---|---|---|---|---|
| 1,341,032 A | * | 5/1920 | Appleby ....................... | 70/209 |
| 1,403,660 A | * | 1/1922 | Weaver ........................ | 70/209 |
| 1,442,120 A | * | 1/1923 | Brasket ........................ | 70/209 |
| 1,449,563 A | * | 3/1923 | Vincent ........................ | 70/209 |
| 1,476,742 A | * | 12/1923 | Vincent ........................ | 70/209 |
| 1,496,861 A | * | 6/1924 | Murphey ...................... | 70/209 |
| 1,545,729 A | * | 7/1925 | Beck ............................ | 70/209 |
| 1,594,574 A | * | 8/1926 | Stanley et al. ................ | 70/209 |
| 1,610,735 A | * | 12/1926 | Bilgere ......................... | 70/209 |
| 4,887,484 A | * | 12/1989 | Peng ........................ | 70/237 X |
| 4,934,479 A | * | 6/1990 | Usina .......................... | 180/287 |
| 5,172,607 A | * | 12/1992 | Wu ........................... | 70/209 X |
| 5,442,942 A | * | 8/1995 | Geisler ......................... | 70/209 |
| 5,794,468 A | * | 8/1998 | Leung .......................... | 70/209 |
| 6,092,403 A | * | 7/2000 | Sh ................................ | 70/209 |
| 6,119,546 A | * | 9/2000 | Steffens, Jr. .............. | 70/237 X |

* cited by examiner

*Primary Examiner*—Suzanne Dino Barrett
(74) *Attorney, Agent, or Firm*—Bacon & Thomas, PLLC

(57) ABSTRACT

A lock structure for a steering wheel. Pivot axles of the lock structure are used to connect a wheel with the seat of the steering wheel so that the steering wheel can be turned to a desired angle. A locking component fixes the angular position of the wheel. The entire steering wheel can make engagement between the wheel and a dashboard or other peripheral devices of the seat of the steering wheel and effectively disable the steering wheel.

4 Claims, 6 Drawing Sheets

LOCK STRUCTURE FOR STEERING WHEEL LOCKING BY TURNING THE WHEEL

BACKGROUND OF THE INVENTION

1. Field of the Invention

The present invention is related to a lock structure for a steering wheel. The lock structure disables the turning of the wheel by tilting the wheel at a suitable angle to restrict the rotation axle of the wheel relative to the axle of the seat of the steering wheel to prevent the wheel from rotating smoothly. After turning, the wheel will be restrained from rotation by other peripheral devices such as the moving lever for the windshield wiper, the moving lever for the indicator lights etc., thus the steering wheel can be disabled. The present invention is especially related to a lock structure for a steering wheel which is integrally connected with the main body of the steering wheel. There is no need to place a lockset over the steering wheel when in use. Thus, the present invention is convenient to use, and the space for such a lockset can be saved.

2. Description of the Prior Art

Conventional theft-proof devices, in addition to the theft-proofing function provided by door locks and power door locks of cars to prevent stealing of articles inside the vehicle, and randomly activating the circuits in the cars upon intrusion, they require theft-proof locks to avoid stealing of cars easily by being riven away after the door locks and power door locks are destroyed. Generally, during normal driving of a car, a suitable control on the steering wheel of the car is needed for accurate driving. If the steering wheel is locked to prevent it from smooth rotation, the car can not be steered well even when the car is running. This will cause difficulty in attempts to steal the car. Thus, there is a need for more powerful measures to prevent car theft.

There is a prior art lock structure with hoops put on the steering wheel of a car. It restrains other members to lock the steering wheel. However, such a lock structure for the steering wheel is extended across the steering wheel, and it is hooped over the steering wheel when in use, and is removed from the steering wheel when not in use. The lockset that is removed is placed at some other location in the car. It is more difficult and inconvenient to use and requires the complicated process of dismounting and mounting of such lockset. It is even inconvenient for the driver to use when a suitable space is required for such device after the device is dismounted from the steering wheel.

SUMMARY OF THE INVENTION

Thereby, the main object of the present invention is to provide a lock structure for a steering wheel which effects locking by turning/tilting the wheel, wherein, the wheel and the seat of the steering wheel are connected by a pivot axle to render the wheel to be able to turn to a suitable angle; and a locking component is provided on the seat of the steering wheel to fix the angular position of the wheel. The entire steering wheel can thus have the wheel thereof turned to a suitable angle to frictionally restrain rotation between the wheel and the dashboard or other peripheral devices of the steering wheel.

Another object of the lock structure for a steering wheel effecting locking by turning the wheel of the present invention is to directly render the wheel to turn to a suitable angle to get the effect of locking the steering wheel without the necessity of hooping an additional lockset over the steering wheel, thus increasing convenience in use, and saving space that would be required for placing such a lock set.

Another object of the lock structure for a steering wheel effecting locking by turning the wheel of the present invention is to provide a positioning pressing button set at the joint of the wheel and the seat of the steering wheel, in order that the wheel can be quickly turned back to the original driving state for the steering wheel when the locking function is removed.

The present invention will be more apparent after reading the detailed description of the preferred embodiments with reference to the accompanying drawings.

DETAILED DESCRIPTION OF THE PREFERRED EMBODIMENT

Figure 1:
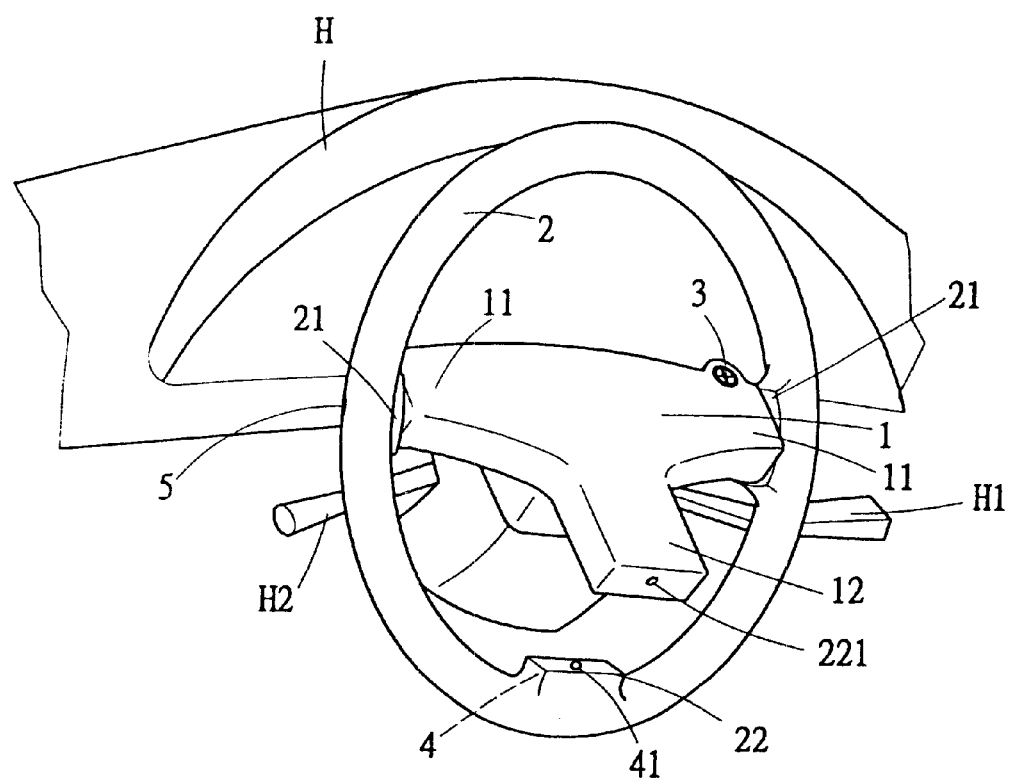
FIG. 1 is a schematic perspective view showing the appearance of the lock structure for a steering wheel of the present invention when locked.
Figure 2:
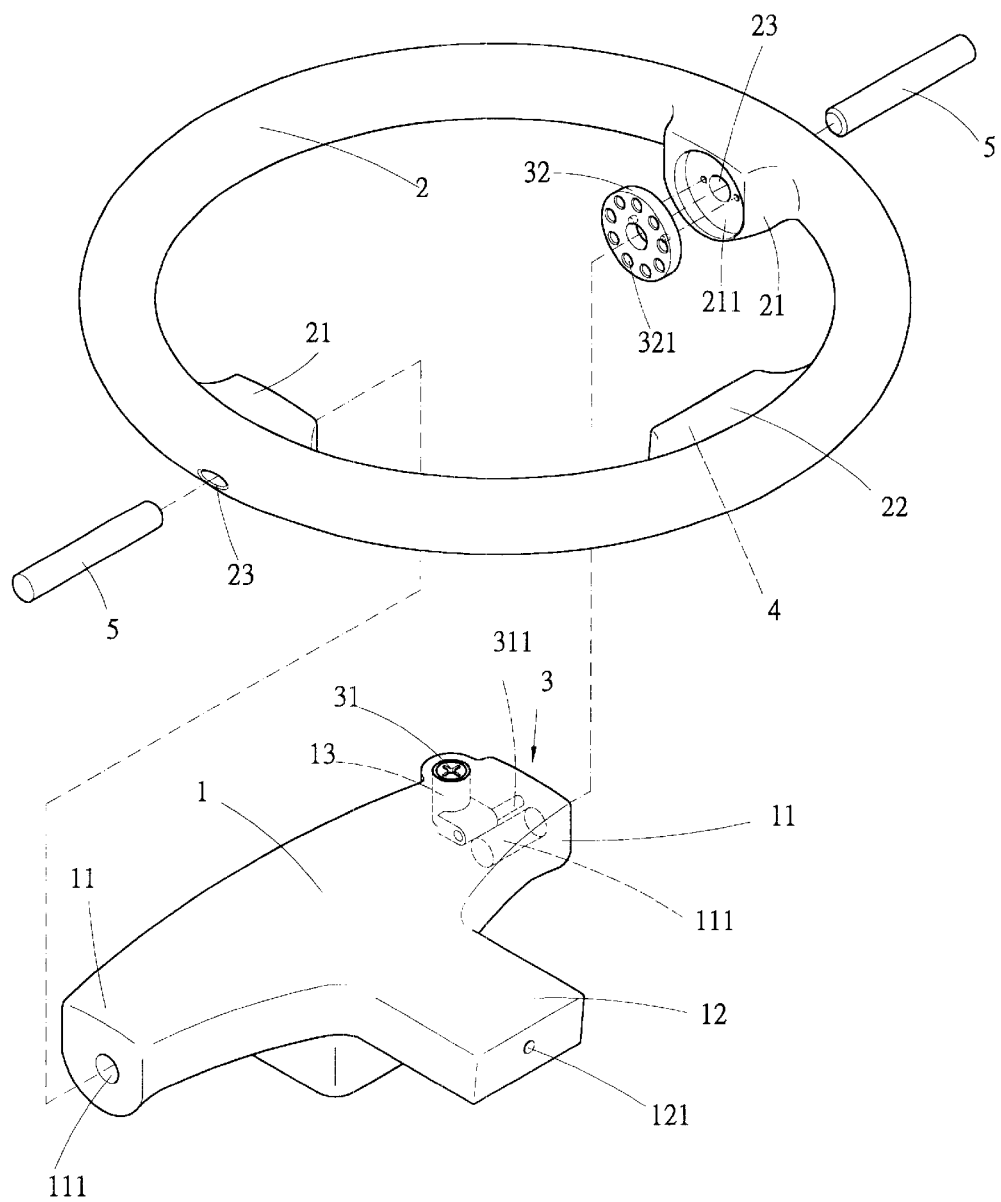
FIG. 2 is an exploded view showing the structure of the present invention.

Referring to the drawings, the lock structure for a steering wheel effecting locking by turning the wheel of the present invention is shown as depicted in FIG. 1 and 2. The main body thereof is comprised of a seat 1 for the steering wheel and a wheel 2 for being held by a driver. The seat 1 of the steering wheel is the main body in connection with the rotation axle of the steering wheel. The seat 1 has a main connecting girder 11 extending laterally to connect with the wheel 2 on both ends thereof and has a secondary connecting girder 12 extending orthogonally to the main connecting girder 11. The wheel 2 forms at the connections with the main connecting girder 11 and the secondary connecting girder 12 respectively two main connecting portions 21 and a secondary connecting portion 22. Two pivot axles 5 are extended through the two main connecting portions 21 into the main connecting girder 11 to allow the wheel 2 to rotate along the axles 5 in relation to the main connecting girder 11. A locking component 3 is provided at the joint between the wheel 2 and the seat 1 of the steering wheel to fix the angular position of the wheel 2 (in relation to the seat 1) and to effect locking function. Thereby, the wheel 2 can be turned or tilted to a suitable angle to make an angular change relative to the axle of the seat 1 of the steering wheel to thereby restrain the steering wheel from rotation. After the wheel 2 is tilted, the wheel 2 can engage the dashboard H or other peripheral devices of the seat 1 of the steering wheel such as a moving lever H1 for the windshield wiper, a moving lever H2 for the indicator lights etc., thus the steering wheel can be immobilized.

Referring also to FIG. 2, the seat 1 of the steering wheel is provided at least near one end of the main connecting girder 11 with a lock barrel hole 13 to fixedly fit therein a lock barrel 31, so that the lock barrel 31 in the locking component 3 can be fixedly mounted on the seat 1 of the steering wheel. A latching pin 311 of the lock barrel 31 protrudes transversely outwardly from one end of the main connecting girder 11. The wheel 2 has at least a receiving groove 211 for receiving therein a locking disk 32 at a location corresponding to that of at least one of the main connecting portions 21 on the main connecting girder 11 having the latching pin 311 thereon. The locking disk 32 is provided thereon with a plurality of positioning holes 321 distributed around the disk 32 with suitable angular spaces for insertion of the latching pin 311. The pivot pins 5 extend from the outside of the wheel 2, through holes 23 of the wheel 2 and the axle hole 5 111 of the main connecting girder 11 of the seat 1 of the steering wheel to connect the wheel 2 and the seat 1 at the end of the main connecting girder 11. When the wheel 2 has been tilted, the latching pin 311 of the lock barrel 31 can be inserted into a positioning hole 321 in opposition thereto, so that the wheel 2 can be fixed at the angular position after turning, and can be locked by means of the lock barrel 31.

Figure 3:
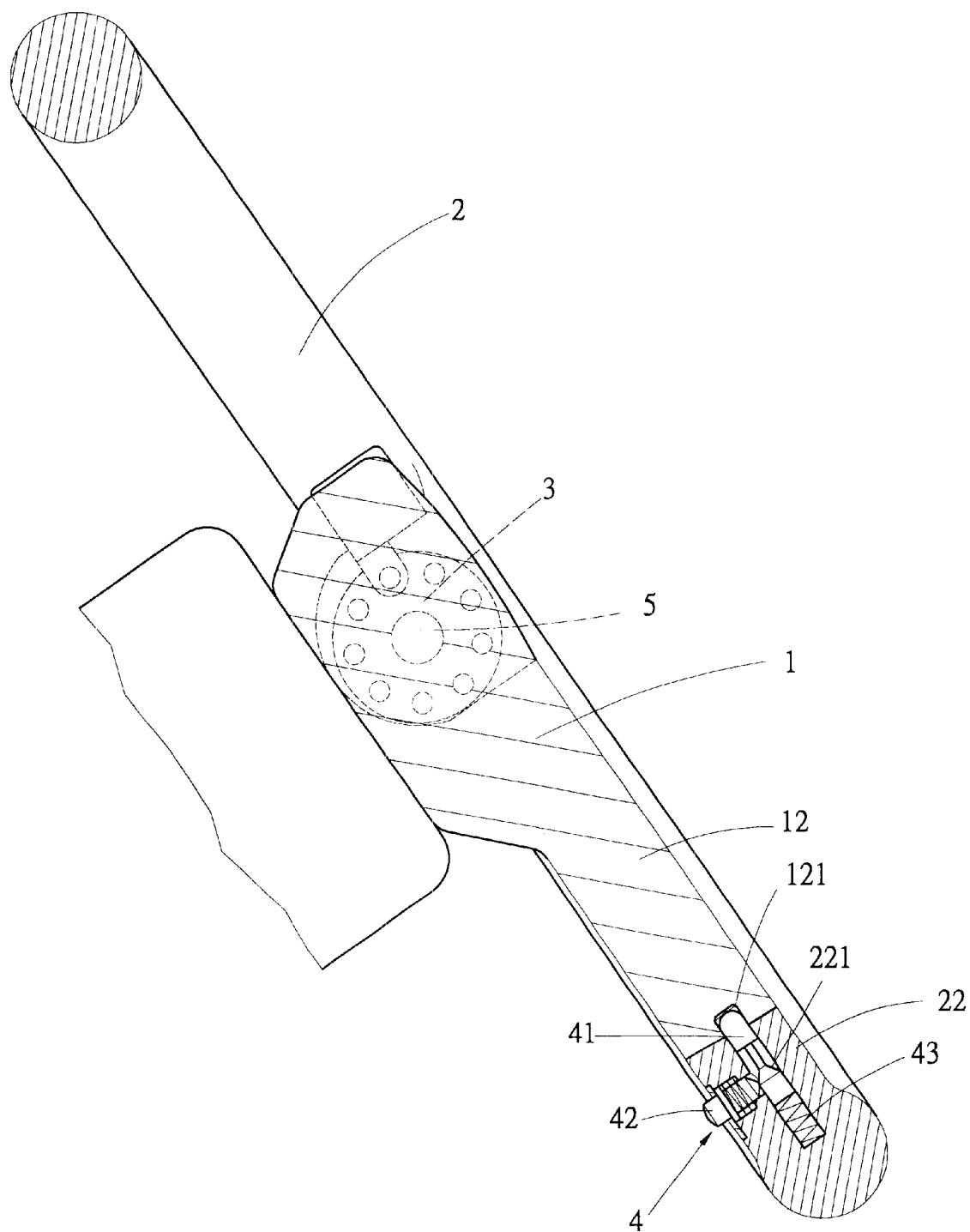
FIG. 3 is a schematic sectional view showing a position prior to the pressing of the button set of the present invention.
Figure 4:
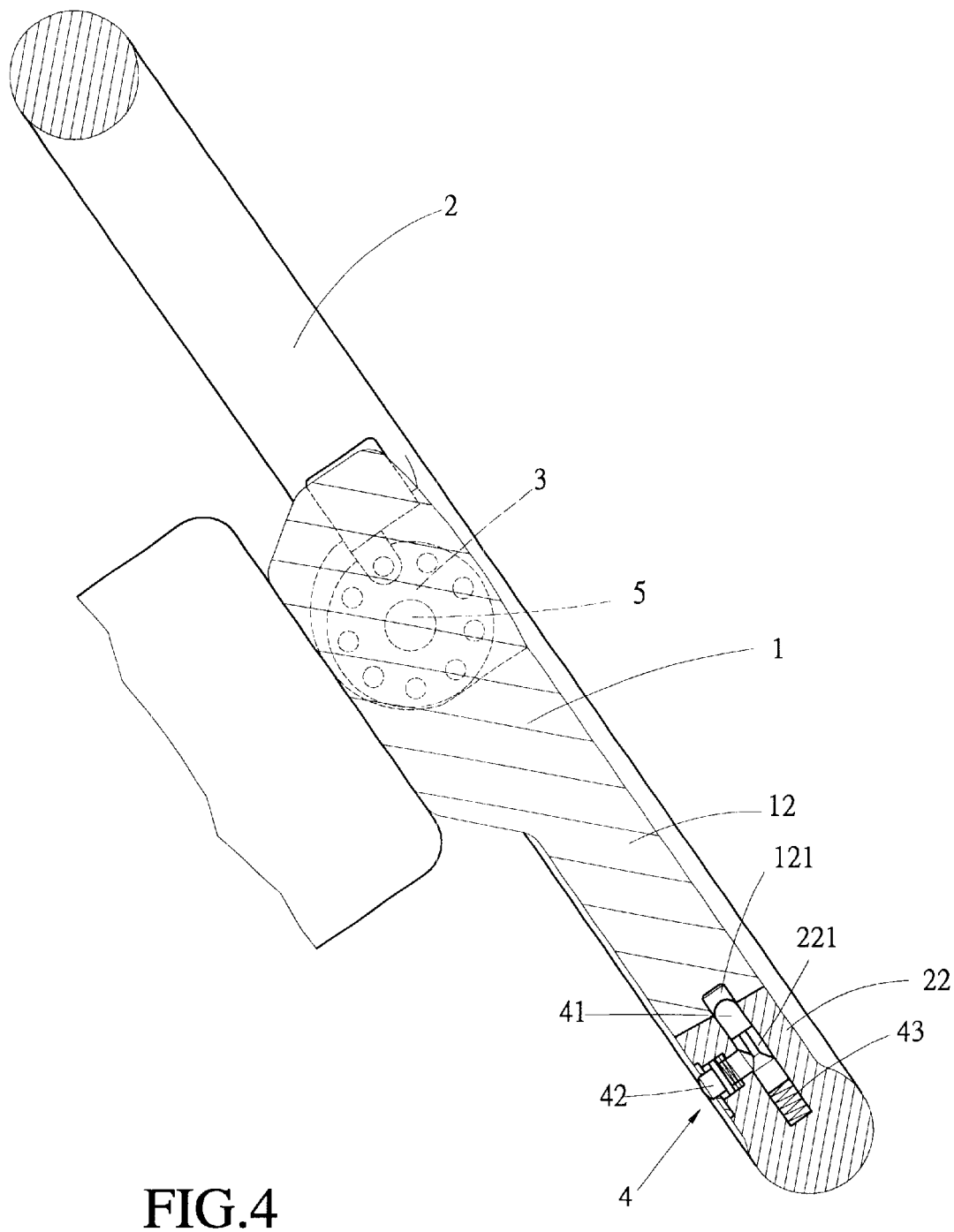
FIG. 4 is a schematic sectional view showing the position after the pressing button set of the present invention is pressed.
Figure 5:
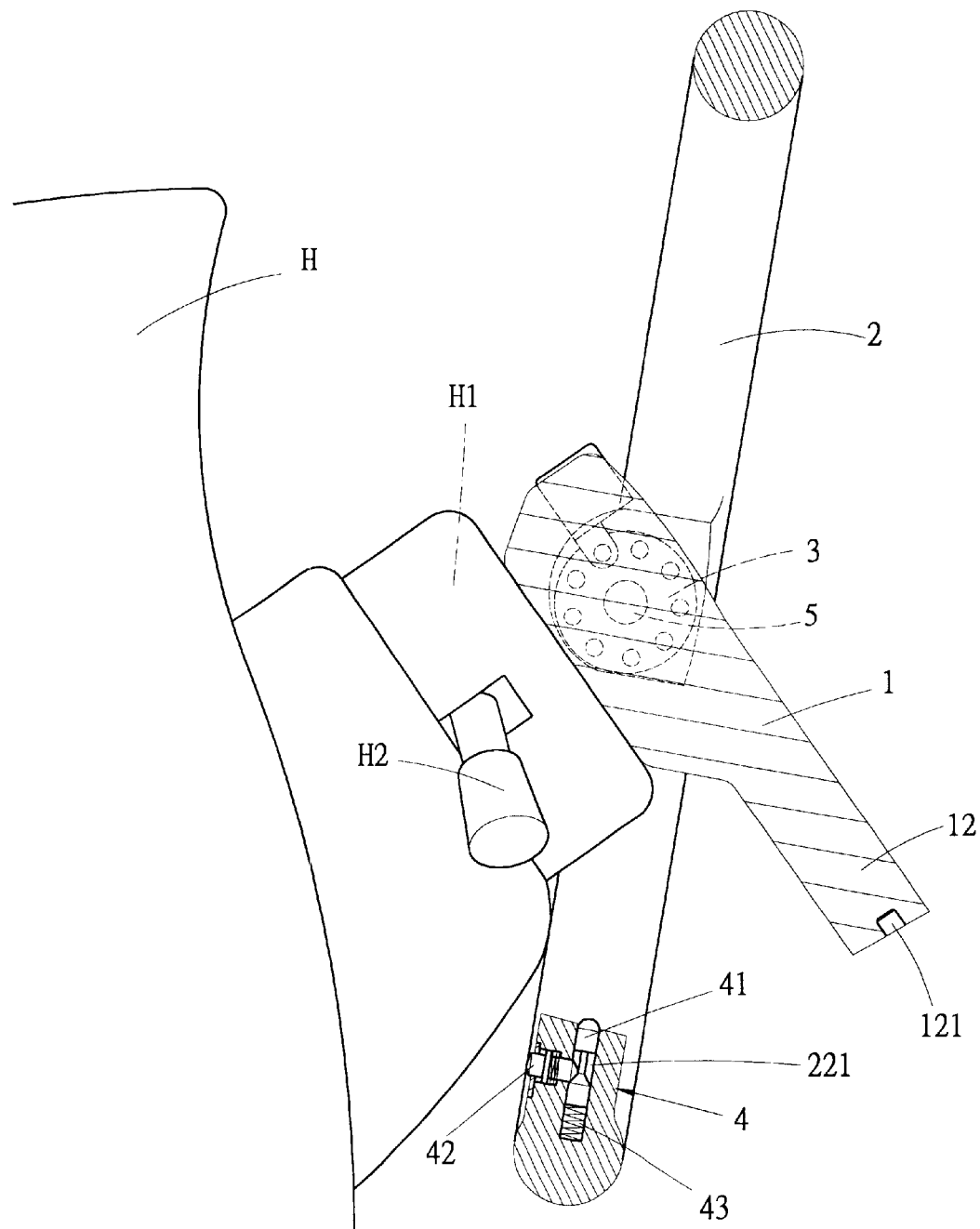
FIG. 5 is a schematic sectional view showing the entire steering wheel of the present invention after it is tilted and locked.

Referring to FIG. 3, the secondary connecting portion 22 of the wheel 2 is provided with a receiving space 221 for receiving therein a positioning pressing button set 4. The positioning pressing button set 4 includes a pressing button 42, a spring 43 and a lock pin 41 which is elastically stretched out of the end surface of the secondary connecting portion 22. And a locking hole 121 is provided on the end surface of the secondary connecting girder 12 for insertion therein by the lock pin 41. As shown in FIG. 3, the entire steering wheel can be strengthened by the insertion engagement of the lock pin 41 into the locking hole 121. When the steering wheel is to be locked to prevent it from being rotated, as shown in FIG. 4, the pressing of the button 42 contracts the lock pin 41 to release the secondary connecting portion 22 of the wheel 2 from engagement with the secondary connecting girder 12 of the seat 1 of the steering wheel. Then the wheel 2 can be tilted to a suitable angle and is fixed at a suitable angular position by locking the function of the locking component 3. Further, as shown in FIG. 5, by engagement between the wheel 2 and the dashboard H or other peripheral devices of the seat 1 of the steering wheel such as a moving lever H1 for the windshield wiper, a moving lever H2 for the indicator lights etc., the steering wheel can not be moved and locking thereof can be effected.

Figure 6:
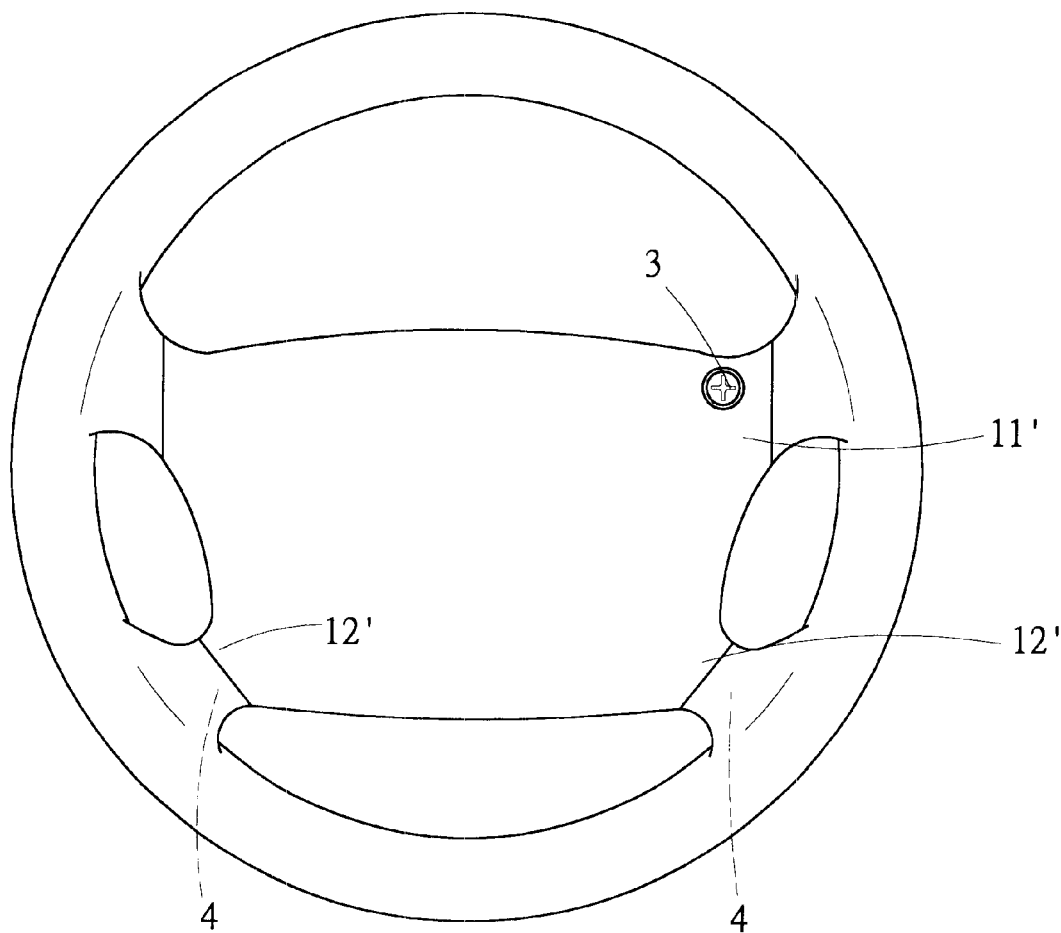
FIG. 6 is a planar view of another embodiment of the present invention with four connecting areas.

And as shown in FIG. 6 which shows the use of the locking component 3 of the present invention on one of two main connecting girders 11' of a steering wheel with four connecting areas, wherein two positioning pressing button sets 4 are used respectively on a pair of narrower secondary connecting girders 12'. In this manner, this embodiment of the present invention is used on the steering wheel with four connecting areas.

In the lock structure for a steering wheel effecting locking by turning the wheel of the present invention wherein the wheel can be turned for a suitable angle to make engagement and to restrain rotation between the wheel and the dashboard or other peripheral devices of the steering wheel, the locking of the steering wheel can be effected without the necessity of hooping an additional lockset over the steering wheel.

What is claimed is:

1. A lockable steering wheel structure comprising:
    a steering wheel comprising two main connecting portions and a secondary connecting portion;
    a seat connectable to a steering rotation axle of a vehicle, the seat includes a main connecting girder, the ends of which are connected to respective ones of the main connecting portions, the seat further includes a secondary connecting girder extending orthogonally from the main connecting girder and connected to the secondary connecting portion;
    two pivot axles that pivotally connect the main connecting girder of the seat to the main connecting portions of the steering wheel;
    a locking component secured between the steering wheel and the seat, the locking component is adapted to lock and unlock the steering wheel to the seat;
    when the locking component is locked, the steering wheel cannot pivot along the pivot axles and when the locking component is unlocked, the steering wheel can pivot along the pivot axes; and
    wherein the steering wheel is pivotable on the pivot axles to be engageable with another part of the vehicle that can contact the steering wheel and the locking component is then locked so that steering of the steering wheel is immobilized.

2. The lockable steering wheel structure as claimed in claim 1, wherein;
    the seat includes a lock barrel opening and a pair of axle holes that each receives a respective one of the pivot axles;
    the locking component includes a lock barrel secured in the lock barrel opening, and a latching pin;
    the steering wheel includes a receiving groove;
    a locking dish is secured in the receiving groove, the locking dish includes a plurality of positioning holes; and
    when the locking component is locked by actuating the lock barrel, the latching pin extends into one of the positioning holes of the locking dish.

3. The lockable steering wheel structure as claimed in claim 2, wherein the secondary connecting girder includes a locking hole, the secondary connecting portion houses a positioning pressing button set which includes a pressing button, a spring and a locking pin, and when the pressing button is pressed the locking pin extends into the locking hole of the secondary connecting girder to lock the secondary connecting girder to the positioning pressing button set.

4. The lockable steering wheel structure as claimed in claim 3, further comprising a second secondary connecting girder and a second positioning pressing button set adapted to attach and detach from the second secondary connecting girder.

* * * * *